June 1, 1965  K. W. FOSTER  3,186,481
METHOD AND APPARATUS FOR DETERMINING THE ORIENTATION
OR DIRECTIONAL FEATURES OF A WELL
Filed Nov. 15, 1961
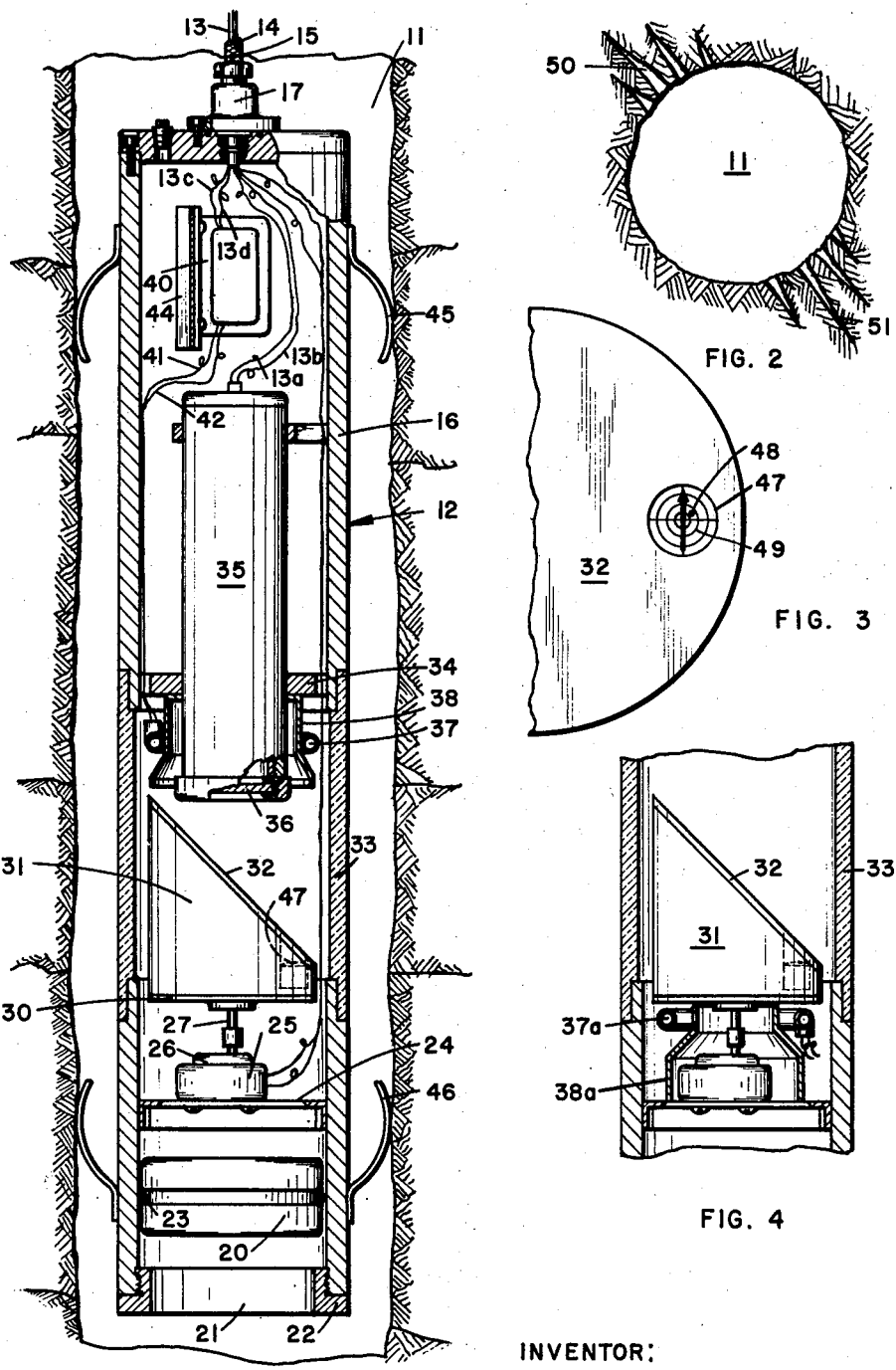
INVENTOR:
K. W. FOSTER
BY: J. H. McCarthy
HIS AGENT

United States Patent Office 3,186,481
Patented June 1, 1965

3,186,481
METHOD AND APPARATUS FOR DETERMINING THE ORIENTATION OR DIRECTIONAL FEATURES OF A WELL
Kenneth W. Foster, Houston, Tex., assignor to Shell Oil Company, New York, N.Y., a corporation of Delaware
Filed Nov. 15, 1961, Ser. No. 152,460
12 Claims. (Cl. 166—4)

This invention relates to the survey and inspection of oil, gas and water wells, and pertains more particularly to a method and apparatus for determining the orientation of directional features within a well borehole, especially a method of determining the preferential direction of flow of fluid to or from a selected formation or strata traversed by a well.

In exploitation operations carred out in oil and gas wells, it is often advantageous to be able to determine the orientation of certain directional features of a producing formation or of a formation into which fluid is to be injected. For example, during the production life of an oil and/or gas field it is often desirable to initiate a secondary recovery process in the field in order to recover large quantities of oil which would otherwise never be produced by normal methods. Flooding of a producing formation with a selected gas or liquid is one of the more common and most successful methods of secondary recovery of oil.

During the flooding operations in secondary recovery, one or more wells in a field are designated as injection wells while other of the wells in the field are designated as production wells. By pumping a liquid or gas into the injection wells under pressure, oil in the formation adjacent the injection wells is forced through the formation to the producing wells where the production fluid accumulates and is produced therefrom in any suitable manner well-known to the art, as by pumping.

Prior to carrying out flooding operations of the above-described type, it is especially important to know the preferential direction of flow of fluid being injected into a selected producing formation so as to determine the area of the oil field from which the greatest amount of production or the greatest increase in production can be expected. Additionally, it may be often desirable in newly drilled wells to have knowledge of the preferential direction of flow fluid from a particular producing formation so that this knowledge may be taken into consideration when selecting the spacing of other wells to be drilled in a field. It is also quite apparent that in the disposal of contaminating fluids by pumping them down a disposal well, it is desirable to know the direction of the flow of fluids being injected into a formation so as to have some idea as to where the contaminating fluids may be going.

It is therefore a primary object of the present invention to provide a method for examining and/or surveying the interior of deep wells such as those encountered in oil and gas fields.

A further object of the present invention is to provide a method and apparatus for examining the directional features of a formation traversed by a well.

Still another object of the present invention is to provide a method and apparatus for determining the preferential direction of flow of fluids being injected into or produced from a formation.

A further object of the present invention is to provide an apparatus for determining the predominant direction in which natural or induced fractures radiate from a well borehole.

These and other objects of the present invention will be understood from the following description taken with regard to the drawing, wherein:

FIGURE 1 is a schematic view taken in partial longitudinal section of the apparatus of the present invention illustrated as being positioned in a well borehole;

FIGURE 2 is a diagrammatic view of a cross-section of a well borehole illustrating vertical fractures radiating therefrom;

FIGURE 3 is a planned view of the reflecting mirror of the apparatus of the present invention; and FIGURE 4 is a longitudinal view in cross-section of another arrangement of a light source for the apparatus of the present invention.

Referring to FIGURE 1 of the drawing, a well borehole 11 is illustrated as having an inspection apparatus 12 suspended therein at the lower end of a weight-supporting and electrical conductor cable which may comprise a plurality of separate insulated conductors 13 formed into a single insulated cable 14 and being provided with suitable weight-supporting means such, for example, as an armored sheath 15 formed on the outside of the cable 14. One or more of the conductors 13 in the cable 14 may be coaxial conductors for transmitting high frequency signals from the inspection apparatus up the well. Such a cable might also be used for other types of downhole logging apparatus, especially if high frequency signals are to be transmitted or if cross-talk is bothersome to the logging apparatus.

The inspection apparatus 12 comprises a fluid-tight housing 16, preferably elongated and tubular in form, which is provided with a fluid-tight connector 17 at the top thereof for securing the armored sheath 15 to the housing 16 while permitting the electrical leads 13 to pass into the housing. Mounted within one wall of the housing 16 is a pressure-responsive movable barrier in the form of a diaphragm, bellows or piston 20 which closes a port 21 in the wall of the housing 16 in a fluid-tight manner and allows the pressure inside and outside of the housing 16 to equalize. In the particular arrangement illustrated, the port 21 in the housing forms an open bottom of the housing 16 in which an end plate or stop ring is fixedly secured to prevent the piston 20 from dropping out of the housing 16 under low-pressure conditions. Suitable sealing means are provided between the outer wall of the piston 20 and the inner surface of the housing 16 to close this space in a fluid-tight manner. In the arrangement shown, an O-ring seal is employed.

Positioned within the housing 16 near the lower end thereof is a bar or perforate plate member 24 on which an electrically driven motor 25 together with suitable speed-reducing means 26 is mounted. The motor 25 is provided with a suitable operating circuit (not shown) whereby the motor can be stopped in any position from the surface so that cracks, fissures, fractures, dip marles, or other geological characteristics may be studied. The shaft 27 of the motor 25, or its speed-reducing device 26, is fixedly secured at its upper end to a base plate 30 and a cylindrically base block 31 whose upper face is beveled at preferably a 45° angle to its axis, or is positioned at preferably a 45° angle to the lens axis of a suitable inspection camera. A reflecting mirror 32 is fixedly secured to the upper beveled face of the face block 31 in any suitable manner for rotation with the block 31 on the shaft 27.

Formed or mouned in the wall of the housing 16 opposite the mirror 32 and extending for a short distance thereabove is a transparent window 33 which extends substantially around the periphery of the housing 16. Coaxially mounted on a support plate 34 within the housing 16 is a suitable camera apparatus having its lens 36 at the lower end thereof directed downwardly toward the mirror 32. While the camera apparatus 35 may be a photographic camera of the automatically and remotely-actuated type well-known to the art, it is preferably a small diameter TV camera having coaxial conductors 13a and 13b connected thereto for applying power thereto and transmitting the signal therefrom to the surface. Use of a photographic camera would necessarily delay any observing of borehole features until the camera was withdrawn to the surface and the film developed. With a television camera, continuous observation or inspection could be carried out while it was in the well.

A suitable light source is mounted in the housing 16 at a point opposite the transparent window 33 in the wall thereof for transmitting light outwardly through the housing to the wall of the well 11 being studied. Preferably, the light source may be in the form of a multi-layer helical light tube or a circular light tube 37 mounted at a point above the lens 36 of the TV camera so that no direct light is received into the camera 35 from the light tube 37. In another form of the apparatus, shown in FIGURE 4, a light tube 37a and reflector plate 38a are illustrated as being mounted below the rotatable mirror 32. If desired, light tubes may be used simultaneously in both locations. When two light tubes are employed, one tube is preferably connected to a source of ultraviolet light so as to permit identification of petroleum in the well or in the well wall.

Concentrically mounted within the light tube 37, as by being suspended from the plate 34, is a reflector plate 38 for reflecting light from the tube out through the window 33 and against the well wall. If needed, a transformer 40 may be fixedly mounted within the housing 16 being supplied by power through electrical leads 13c and 13d while being electrically connected to the light tube 37 through leads 41 and 42. The transformer 40 may be secured to the wall of the housing 16 by a bracket 44. If desired, one or more sets of spring type centralizers 45 and 46 may be fixedly mounted on the outer wall of the housing 16 for centrally positioning the inspection apparatus within the well 11 and prevent its rotation as it is being raised or lowered in the well.

Positioned within the housing 16 within viewing range of the camera 35 is an azimuth-indicating device such as a compass 47 (FIGURE 3). In the particular arrangement illustrated the compass 47 is mounted in a recess within the base block 31 of the mirror with a portion of the mirror 32 above the compass being removed so that the compass can be continually viewed by the TV camera 35. It is to be understood that, alternatively, the compass 47 could be mounted on the lower end of the TV camera 35, just below its lens 36.

In FIGURE 2 a series of vertically-directed fractures 50 and 51 are illustrated as extending or radiating into the adjacent formation from the borehole 11. For ease of illustration, these fractures 50 and 51 are shown as extending into the adjacent formation less than the diameter of the well 11 although it is to be understood that in general, it is believed that such fractures, which may be induced by conventional fracturing methods well-known to the art, often extend to many feet into the formation. Below a depth of say 3,000 to 4,000 feet, fractures in substantially horizontal formation are substantially vertical rather than horizontal. Also, it has been found that in many fields induced fractures of the above type may have a definite orientation, being predominantly formed in a direction which may be related to the permeability of the formation.

Thus, in practicing the method of the present invention for determining the preferential direction of flow of fluid from a production well, or the flow of fluid to be injected into a formation during a secondary recovery or a water-disposal operation, the formation in question is first fractured and the inspection apparatus of the present invention is lowered to a point opposite the fractured formation so as to illuminate the fractured portion of the well and observe the direction of the fractures while simultaneously observing the compass to determine the directional orientation of the fractures. For secondary recovery operations, after choosing an injection well, a zone of the well would be selected at points above and below the formation interval into which flooding fluid was to be injected and the well would be sealed at these points. After sealing the well in this manner a conventional formation-fracturing operation would be carried out opposite the sealed-off zone. Subsequently the fractured zone of the well would be opened or unsealed and the inspection apparatus of the present invention would be lowered to the level of the fractured formation to determine the directional orientation of the fractures. In order to observe clearly borehole features such as fractures, it is generally necessary to either swab or pump out the well to a point below the fractures to be observed, or to spot a volume of clear fluid such as water or a clear hydrocarbon opposite the fractured formation. In water injection wells the entire well may be filled with clean water by pumping water down the well and forcing the fluid previously filling the well into the injection formation. When the inspection apparatus of the present invention is provided with a TV camera 35, its receiving apparatus (not shown) would be positioned at the surface and employed to observe continuously the formation traversed by the well as the inspection apparatus was being raised or lowered on its cable 14.

Relative permeabilities of various formations traversed by a well may be determined by using the apparatus of the present invention when equipped with an ultraviolet light source. Thus, for example, if it was desired to determine into what formation water was being injected in a water disposal well, a quantity of oil, say one barrel, could be pumped down the well and it would flow into the most permeable formation. By lowering the present television inspection apparatus with an ultraviolet light source down the well to illuminate the formations, the fluorescence of the oil adhering to the most permeable formation would be observed. When determining relative permeabilities of formations over a selected zone or interval of the well, the well is preferably packed-off or sealed above and below the desired zone before injecting the oil through the top packer of the zone. The zone would then be opened to permit running the inspection apparatus down the well.

The television inspection apparatus of the present invention with an ultraviolet light source may also be used to observe fluorescence to determine an oil-bearing formation in a well. Oil flow in water is also readily recognized by the present apparatus. It has also been found useful for determining well casing corrosion, plugged perforations in liners, split pipes, deposits on the interior of pipes, etc., as well as the location of objects lost in a well. Geological features in the borehole wall relating to permeability, dip, etc. may also be observed.

In determining the dip and strike of a formation by by means of the television inspection apparatus of the present invention, any suitable type of an inclinometer could be mounted within the housing 16 within range of the television lens of camera 35. One simple visibly indicating form of an inclinometer may comprise a bubble 48 of a light or low specific gravity fluid adapted to move freely under the curved top of the compass 47 which may be filled with a relatively heavy liquid on which the bubble 48 of the light immiscible liquid would float. As the television inspection apparatus of the present invention was lowered through a portion of the well borehole which deviated from the vertical, the bubble 48 of liquid would move from a center position of the compass so as to stay in a vertical line with the surface. A series of concentric rings 49 may be drawn on the top of the compass, or superimposed on a transparent template thereabove, to give an indication of the degree of inclination of the television apparatus at the time of observation. With the lines 49 in FIGURE 3 indicating 5-degree intervals, the position of the bubble 48 would indicate an inclination of seven or eight degrees from the vertical. Instead of a bubble, a small spherical float could be employed under the cover glass of the compass. The float would be small enough so that it would not interfere with the movement of the compass needle. The bubble or float is generally of a color different from the fluid in which it moves.

It may be seen that the apparatus of the present invention provides a new type of information with regard to wells by the simultaneous observation of both the zone of a well borehole to be investigated and an indicator of a device measuring a property within the well. In the illustrated example, a fractured zone of a well is simultaneously observed along with a visibly indicating compass and dipmeter or inclinometer. In numerous instances, it is important to know the shape and geographic orientation of materials within the well or features in the formation surrounding the well. In addition, it is often important to measure variations in physical properties at the time the measuring devices are in known proximity to the material being measured. For example, a generally permeable formation may contain impermeable stringers or thin formation layers, such as shale stringers, which are different in appearance from the other components of the reservoir formation. Particularly important formation concerning such a reservoir includes the depth at which the shale is encountered, the orientation of the shale stringers, and the variations in a formation characteristic or quantity, such as resistivity, which characterizes the approach of a measuring device to the boundaries of the shale stringers. The latter information permits more precise interpretations of, for example, resistivity logs in other wells which are likely to encounter the same formations.

The present invention provides a means for substantially simultaneously determining the depth, the orientation, and the resistivity characteristics of such shale stringers. This may be accomplished, for example, by a visual display of zone within the well including the surrounding formations, while simultaneously displaying an inclination-indicating compass, and the indicator arm of a voltmeter responsive to resistivity. Thus, the housing 16 of the present apparatus could contain therein any suitable type of resistivity measuring device well known to the art which would be connected to a visual indicating device such as the indicator arm of a voltmeter which would be positioned in the housing 16 within view of the camera 35 so that it may be observed at all times in the same manner as compass 47. When a shale interface appeared in the televised view of the top of the well, the depth measurement of the apparatus is readily measured by a change in the length of the cable at the surface. The azimuthal direction in which the formation is viewed is measured by the compass needle. The magnitude and direction in which the viewed section of formation is inclined are measured by the inclinometer, and this indicates the magnitude and direction of the slope of the interface in a plane perpendicular to the direction in which the formation is viewed. The magnitude of the resistivity which is exhibited when the measuring device has the indicated spatial relationship with the interface is measured by the voltmeter.

It may be readily seen that other instruments such as visibly indicating temperature measuring devices, pressure indicators, etc., may be mounted in the housing 16 of the pressure indicators, etc., may be mounted in the housing 16 of the present invention within view of the camera 35 in a manner similar to the compass 47. Thus, a method of inspecting earth formations traversed by a well is provided in which a visual inspection apparatus such as the television camera is lowered into the well together with a source of light and a measuring and indicating device for visibly indicating a measure of a physical property of the earth formation traversed by the well. The measurement indicating device and the interior of the well are illuminated in the zone of the well under inspection while a televised view of the measurement indicating device and zone of the well are displayed at a point adjacent the top of the well. When several visible indicators of various physical property measuring instruments are displayed within the well borehole in range of the television camera, the present apparatus provides a means for the simultaneous transmission of large quantities of information. Such transmission has been virtually impossible to date because of the limited capabilities of signal transmission cables used in well logging. The weight-supporting electrically conductive cable of the present invention includes at least one coaxial electrical conductor electrically connected to a device for responding to a physical property, for transmitting a high frequency signal to a surface location, and at least one separate insulated conductor connected to suitable actuating means for transmitting a low frequency signal thereto. Well devices for responding to a physical property within the above definition include various logging apparatus, for example velocity well log receivers, in addition to the above-described television apparatus. The actuating means spoken of above may be in the form of a motor in the television apparatus or power amplifiers or circuits in logging apparatus.

A cable of the type described hereinabove provides a well logging cable uniquely free of signal interference due to cross-talk and capacitance pick-up. This cable comprises at least one coaxial electrical conductor and at least one separate insulated electrical conductor surrounded by a weight-supporting, relatively inextensible conductive metal sheath in an arrangement such that, in response to tensile forces, the elongation of the sheath is less than an amount of elongation exceeding the elastic limits of the conductors surrounded by the sheath. It is particularly useful in well logging systems, such as the present apparatus containing a television camera, acoustic, electromagnetic, radioactivity, or the like, logging instruments which contain means for responding to a physical property and producing a high frequency electrical signal corresponding to the property. For example, such a cable provides a material reduction in the signal interference problem described in U.S. Patent 2,708,485, and is suited for transmitting the electrical signals corresponding to acoustic impulses which arrive in sequence at well logging receivers spaced at unequal distances from a sound source.

In the above-described television apparatus, the light source can comprise a means for producing substantially any form of light by which an illumination results in a visual image or an image that can be converted to a visual image, such as ultraviolet light, infra-red light, or the like.

I claim as my invention:

1. A method of determining the preferential direction of flow of fluid injected into a formation traversed by a well, said method comprising the steps of selecting a well for inspection, sealing off in the well at least a portion of a formation interval into which a fluid is to be injected, fracturing the formation opposite the sealed-off well portion, unsealing the sealed-off portion of the well, lowering an inspection apparatus and an azimuth indicating device down the well to the level of the fractured formation, providing a substantially transparent fluid in the well between the inspection apparatus and the portion of the formation to be illuminated and observed, illuminating the fractured formation, scanning the fractured formation of the well, visually observing the fractures in said formation relative to the reading of said azimuth-indicating device, and simultaneously determining the directional orientation of said fractures.

2. The method of claim 1 including the step of emptying the well to a level below said fractured portion after unsealing the sealed-off portion of the well.

3. The method of claim 1 including the step of positioning a volume of a transparent liquid in the well in contact with the walls thereof at a level to surround said inspection apparatus during the step of scanning the fractured formation of the well.

4. The method of claim 1 including the step of emptying the well to a level below the formation to be observed prior to lowering said inspection apparatus.

5. A method of determining the preferential direction of flow of fluid injected into a formation traversed by a well, said method comprising the steps of selecting a well for an injection well, sealing off a zone of the well at points above and below a portion of a formation interval into which a fluid is to be injected, fracturing the formation opposite the sealed-off zone, unsealing the sealed-off zone of the well, lowering a television camera and compass down the well to the level of the fractured formation, providing a transparent fluid in the well between the television camera and the portion of the formation to be illuminated and observed, illuminating the fractured formation, scanning the wall of the well to locate the fractures therein relative to the reading of said compass, and simultaneously determining the directional orientation of said fractures.

6. A method of determining the relative permeability of at least two formations traversed by a well, said method comprising the steps of selecting at least two adjacent formations traversed by a well, sealing off a zone of the well at points above and below the formations to be tested, spotting a small quantity of oil in the well adjacent said formations, injecting said oil into the more permeable of said formations, lowering a television camera down the well to the level of the formations, illuminating said formations with ultraviolet light, and observing the fluorescence on the more permeable formation into which the oil was injected.

7. Apparatus for determining the orientation of directional features within a well borehole, said apparatus comprising a fluid-tight housing, transparent window means in said housing wall and extending substantially around the periphery thereof, light source means positioned in said housing opposite said window means to radiate light directly through said window means, camera means fixedly and coaxially mounted within said housing, a mirror rotatably mounted in said housing opposite said window means at an angle to reflect an image of an object outside said window means to said camera means, said mirror being at an angle to the axis of the camera means, motor means mounted in said housing and operatively connected to said mirror means to rotate the mirror means and scan the window means of said housing, azimuth-indicating means mounted in said housing at all times in direct viewing range of said camera means, and weight-supporting and electrical conductor cable means secured to one end of said housing and electrically connected to the electrically-actuated components thereof.

8. Apparatus for determining the orientation of directional features within a well borehole, said apparatus comprising an elongated fluidtight housing, transparent window means in said housing well and extending substantially around the periphery thereof, light source and reflector means positioned in said housing opposite said window means to radiate light directly through said window means, a television camera fixedly and coaxially mounted within said housing, a mirror rotatably mounted in said housing opposite said window means at an angle to reflect an image of an object outside said window means to said television camera, said mirror being at an angle to the axis of the television camera, motor means mounted in said housing and operatively connected to said mirror means to rotate the mirror means and scan the window means of said housing, compass means mounted in said housing at all times in direct viewing range of said television camera, and weight-supporting and electrical conductor cable means secured to one end of said housing and electrically connected to the electrically-actuated components thereof.

9. The apparatus of claim 8 wherein the light source comprises at least one annular light tube positioned out of range of said television camera.

10. The apparatus of claim 8 wherein the light source comprises at least one source of incandescent light and another source of ultraviolet light.

11. Apparatus for determining the orientation of directional features within a well borehole, said apparatus comprising an elongated fluidtight housing having a port therein, pressure-responsive movable barrier means closing said port in a fluidtight manner to equalize the pressure inside and outside of said housing, transparent window means in said housing wall and extending substantially around the periphery thereof, light source and reflector means positioned in said housing opposite said window means to radiate light directly through said window means, a television camera fixedly and coaxially mounted within said housing to one side of said window means, a mirror rotatably mounted in said housing opposite said window means at an angle to reflect an image of an object outside said window means to said television camera, said mirror being at an angle of 45° to the axis of the television camera, motor means monuted in said housing and operatively connected to said mirror means to rotate the mirror means and scan the window means of said housing, compass means mounted in said housing at all times in direct viewing range of said television camera, and weight-supporting and electrical conductor cable means secured to one end of said housing and electrically connected to the electrically-actuated components thereof.

12. The apparatus of claim 11 wherein said cable means includes coaxial conductors located within said cable means and connected to said television camera for transmitting high-frequency signals therefrom.

References Cited by the Examiner

UNITED STATES PATENTS

| Re. 23,733 | 11/53 | Farris. | |
| 2,133,776 | 10/38 | Bender | 166—4 |
| 2,206,922 | 7/40 | Smith | 166—4 |
| 2,700,734 | 1/55 | Egan et al. | 166—4 |
| 2,724,267 | 11/55 | Bond et al. | 73—155 |
| 2,812,697 | 11/57 | Laval | 33—205.5 |
| 2,849,530 | 8/58 | Fleet | 73—155 X |
| 2,953,350 | 9/60 | Moore | 166—4 |
| 2,971,259 | 2/61 | Hahnau | 166—4 X |

FOREIGN PATENTS

| 1,068,196 | 11/59 | Germany. |
| 1,080,945 | 5/60 | Germany. |
| 1,084,666 | 7/60 | Germany. |

BENJAMIN HERSH, *Primary Examiner.*

NORMAN YUDKOFF, *Examiner.*